(12) United States Patent
Mariotti

(10) Patent No.: US 9,567,197 B2
(45) Date of Patent: Feb. 14, 2017

(54) INDUSTRIAL TRUCK WITH LOAD ROLLERS LOCATED ON LOAD ROLLER CARRIERS ON A WHEELARM

(71) Applicant: OM Carrelli Elevatori S.p.A., Lainate (IT)

(72) Inventor: Fabio Mariotti, Guastalla (IT)

(73) Assignee: OM Carrelli Elevatori S.p.A., Lainate (IT)

( * ) Notice: Subject to any disclaimer, the term of this patent is extended or adjusted under 35 U.S.C. 154(b) by 446 days.

(21) Appl. No.: 14/043,972

(22) Filed: Oct. 2, 2013

(65) Prior Publication Data

US 2014/0166951 A1    Jun. 19, 2014

(30) Foreign Application Priority Data

Oct. 15, 2012 (DE) .......................... 10 2012 109 789
Jan. 17, 2013 (DE) .......................... 10 2013 100 468

(51) Int. Cl.
*B66F 9/065* (2006.01)
*B62B 3/06* (2006.01)

(52) U.S. Cl.
CPC ............. *B66F 9/065* (2013.01); *B62B 3/0631* (2013.01); *B62B 2203/20* (2013.01)

(58) Field of Classification Search
CPC ..... B62B 3/0631; B62B 2203/20; B66F 9/065
See application file for complete search history.

(56) References Cited

U.S. PATENT DOCUMENTS

| | | | | |
|---|---|---|---|---|
| 2,178,647 A | * | 11/1939 | Raymond | ................ B62B 3/06 254/2 C |
| 2,274,164 A | * | 2/1942 | Quayle | ................ B62B 3/0625 254/2 C |
| 2,361,544 A | * | 10/1944 | Hastings, Jr. | ......... B62B 3/0625 254/2 C |
| 2,422,538 A | * | 6/1947 | Framhein | ............. B62B 3/0618 254/2 B |
| 2,550,548 A | * | 4/1951 | Framhein | ................. B62B 3/06 254/10 C |

(Continued)

FOREIGN PATENT DOCUMENTS

DE    102009033709 A1   1/2011
EP        1690823 A2   8/2006
(Continued)

*Primary Examiner* — Joseph J Hail
*Assistant Examiner* — Joel Crandall
(74) *Attorney, Agent, or Firm* — The Webb Law Firm

(57) ABSTRACT

An industrial truck (1) has a drive section (2) and a load section (4) movable relative to the drive section (2). The load section (4) has at least one wheelarm (5) having at least one load roller (6). The load roller (6) is rotatably mounted in a load roller carrier (12) swively-mounted by a swivel bearing (13) on the wheelarm (5). In the vicinity of the swivel bearing (13), on the upper side of the wheelarm (5), there is an entry guide (20). The guide (20) includes at least one roller (21; 22; 23; 24) rotatably mounted on the wheelarm (5) and projecting upwardly beyond a load-bearing surface (LF) of the wheelarm (5). The swivel bearing (13) of the load roller carrier (12) includes a bearing pin (25). The at least one roller (21; 22; 23; 24) is rotatably mounted on the bearing pin (25).

8 Claims, 6 Drawing Sheets

(56) References Cited

U.S. PATENT DOCUMENTS

| | | | | |
|---|---|---|---|---|
| 2,601,171 | A | * | 6/1952 | Schreck ................ B62B 3/0612 16/438 |
| 2,623,756 | A | * | 12/1952 | Elliott .................... B62B 3/0612 254/2 B |
| 2,661,183 | A | * | 12/1953 | Framhein .............. B62B 3/0612 254/2 B |
| 2,681,202 | A | * | 6/1954 | Germond .............. B62B 3/0618 254/10 C |
| 2,783,905 | A | | 3/1957 | Marcusson |
| 2,993,703 | A | * | 7/1961 | Paradise ............... B62B 3/0612 254/2 B |
| 3,261,617 | A | * | 7/1966 | Becker .................. B62B 3/0618 254/2 R |
| 3,392,858 | A | | 7/1968 | Fernstrom et al. |
| 5,433,580 | A | * | 7/1995 | Kempf .................... A61G 3/06 187/200 |

FOREIGN PATENT DOCUMENTS

| | | | |
|---|---|---|---|
| GB | 667585 | 3/1952 | |
| GB | EP 0253778 A2 * | 1/1988 | .............. B66F 9/122 |
| WO | 02100760 A1 | 12/2002 | |
| WO | 2013055214 A1 | 4/2013 | |

\* cited by examiner

INDUSTRIAL TRUCK WITH LOAD ROLLERS LOCATED ON LOAD ROLLER CARRIERS ON A WHEELARM

CROSS REFERENCE TO RELATED APPLICATIONS

This application claims priority to German Applications DE 102012109789.5 filed Oct. 15, 2012 and DE 102013100468.7 filed Jan. 17, 2013, both of which are herein incorporated by reference in their entirety. This application is related to U.S. application Ser. No. 14/044,042 entitled "Industrial Truck With Wheelarm Lever System" and to U.S. application Ser. No. 14/042,847 entitled "Industrial Truck With Load Rollers Located In Swiveling Load Roller Carriers", both filed concurrently herewith and both herein incorporated by reference in their entirety.

BACKGROUND OF THE INVENTION

Field of the Invention

This invention relates to an industrial truck, in particular a lift truck, with a drive section and a load section that can be raised and lowered relative to the drive section. The load section has at least one wheelarm which is provided with at least one load roller. The load roller is mounted so that it can rotate in a load roller carrier and the load roller carrier is swively-mounted by a swivel bearing on the wheelarm.

Description of Related Art

Industrial trucks with wheelarms are used to lift a pallet by driving the wheelarms under the pallet and then lifting the wheelarms to lift the pallet. For this purpose, the load section is raised or lowered relative to the drive section. Load roller carriers in which the load rollers are mounted are actuated by a system of levers and a linkage and can thus be swiveled outwardly and downwardly or inwardly and upwardly to raise or lower the wheelarms, respectively. On low-lift trucks or order pickers, a lifting movement of this type is called a low-lift, while on high-lift trucks with an additional lifting frame, it is called the initial lift.

Lift trucks with load rollers located on the wheelarms in pivoting load roller carriers, which are actuated by means of a linkage and a system of levers, are described, for example, in EP 1 690 823 B1 or DE 10 2009 033 709 A1. Conventional lift trucks are designed for the handling of standardized "euro pallets", which have an entry height for the wheelarms of 100 mm and, for this purpose, the trucks have a wheelarm height of the wheelarms in the fully lowered position of approximately 85 mm.

With the wheelarms in the lowered position, the wheel arms can be inserted into the pickup openings of a pallet on the ground or floor. On pallets, in particular special pallets with a lower entry height of the pickup openings than on standard euro pallets, the upper sides of the wheelarms can slide along the underside of the pallet. The upper sides of the wheelarms form the load-bearing surface with which the pallet is picked up and lifted. Thus, when the wheelarms are inserted, a great deal of friction occurs under the pallet and, therefore, a great deal of force is required to push the wheelarms into the pallet. Under some conditions, the pallet can be damaged. Damage can occur in particular if the pallet is sagging under a load or is damaged, and thus the entry height of the pickup openings of the pallet, which is the distance from the surface of the road to the underside of a load bearing surface of the pallet, is reduced.

Therefore, it is an object of the invention to provide an industrial truck of the general type described above but which can be driven safely and with a small amount of force under pallets which have a low entry height.

SUMMARY OF THE INVENTION

This object is accomplished by providing that, in the vicinity of the swivel bearing of the load roller carrier on the upper side of the wheelarm, there is an entry guide to facilitate driving the forks under a pallet. The guide is formed by at least one roller mounted so that it can rotate on the wheelarm and projecting beyond a load-bearing surface on the upper side of the wheelarm. With one or more rollers located on the upper side of the wheelarm and mounted so that they can rotate on the wheelarm, and with the rollers projecting slightly upwardly in the vertical direction above the load bearing surface formed by the upper side of the wheelarm, it is possible in a simple manner to form an entry guide. This guide makes it easier to drive the forks under a pallet and to insert the wheelarms into the pickup openings of the pallet. With a correspondingly reduced entry height, when the task is to lift a damaged pallet or a pallet that is sagging under a load, for example, the rollers can come into contact with the underside of the load-bearing surface of the pallet. By means of the rotational roller or rollers, only a relatively low level of friction is produced and thus low levels of force are required to insert the wheelarms into the pickup openings of the pallet, thereby preventing damage to the pallet during the insertion of the wheelarms and making it possible to pick up the pallet safely and securely.

The rollers located on the upper side of the wheelarms of the invention can be mounted so that they can rotate in suitable bearings on the wheelarm.

In one advantageous embodiment of the invention, the swivel bearing of the load roller carrier comprises a bearing pin located in the wheelarm. At least one roller is mounted so that it can rotate on the bearing pin. The bearing pin on which the load roller carrier is swively-mounted on the wheelarm therefore also serves as the bearing of the at least one roller of the entry guide. This feature makes possible a compact and space-saving mounting of the rollers, which makes possible a low height of the wheelarms in the lowered position.

If the load roller carrier has two lateral bearing levers, in each of which there is an outer bushing or bearing eye for the bearing pin, the at least one roller is advantageously located between the bearing levers. With a location of the rotatable rollers between the two lateral bearing levers of the load roller carrier, a central location of the at least one roller with reference to the wheelarm in the transverse direction of the vehicle can be achieved. This makes possible an easy insertion of the wheelarms into the pickup openings of the pallet.

It is particularly advantageous if the bearing pin is supported in alteration in a bearing eye of the wheelarm and a bearing eye of the load roller carrier. It is also advantageous if a roller is located in the longitudinal direction of the bearing pin between the bearing eye of the wheelarm and the bearing eye of the load roller carrier. With a location of this type of the bearing eyes in the wheelarm and the load roller carriers, the bearing pin can be supported at more than two bearing points on the wheelarm. This makes it possible to reduce the diameter of the bearing pin without the danger of deflection or deformation of the bearing pin and to achieve low loads caused by the forces exerted on it, as a result of which a low height of the wheelarms in the lowered position becomes possible. The location of a plurality of rollers each between a bearing eye of the wheelarm and a neighboring bearing eye of the load roller carrier results in a simple construction and a simple bearing system for the rollers and facilitates the insertion of the wheelarms into the pickup openings of the pallet in a particularly effective manner.

It is particularly advantageous if the load roller carrier has two outer bearing eyes and a center bearing eye for the bearing pin. One bearing eye of each wheelarm is located between the center bearing eye and the outer bearing eye of the respective load roller carrier and a roller is each located between the bearing eye of the wheelarm and the center bearing eye and the outer bearing eye of the load roller carrier. With an additional center bearing eye for the bearing pin on the load roller carrier and additional bearing eyes for the bearing pin on the wheelarm, each of which is located between the center bearing eye and the outer bearing eye of the load roller carrier, it is possible to achieve a secure mounting of the bearing pin. This makes possible a particularly effective reduction of the diameter of the bearing pin, which in turn makes it possible to achieve a low height of the wheelarms in the lowered position. If one roller is located between the bearing eye of the wheelarm and the center bearing eye of the load roller carrier and one roller is located between the bearing eye of the wheelarm and the outer bearing eye of the load roller carrier, the result is an entry guide with a total of four rotatable rollers, which makes it possible to insert the wheelarms into the pickup openings of the pallet in a particularly effective manner.

In one preferred embodiment of the invention, stop means for the lowered position of the wheelarm are located between the load roller carrier and the wheelarm. With stop means of this type between the load roller carrier and the wheelarm, it becomes possible in a simple manner to limit the swiveling movement of the load roller carrier in the lowered position of the wheelarm, in which the load roller carriers are swiveled upwardly in the wheelarm, and it becomes possible to leave an open space between the at least one roller of the entry guide mounted on the bearing pin and the linkage that actuates the load roller carrier. This makes the rotation of the rollers possible. When the wheelarms are inserted into the pickup openings of the pallets, it is thereby possible to ensure that the rollers roll along the pallet to produce a low level of friction during the entry of the wheelarms into the pallet.

In one preferred embodiment of the industrial truck of the invention, the wheelarm has a wheelarm height of less than 50 mm in the fully lowered position of the load section. With the entry guide formed by the at least one roller on the upper side of the wheelarms, only a small amount of force is required to drive the industrial truck of the invention underneath and to pick up special pallets, such as pallets made of paper or cardboard, for example, with an entry height that is lower than a standard euro pallet, and to prevent damage to the pallet when the wheelarms are driven underneath it.

The invention further relates to a system comprising an industrial truck with a wheelarm height in the fully lowered position of the load section of a maximum 50 mm and a special pallet which has an entry height of the pickup openings for the wheelarms of the industrial truck of 50 mm between the surface of the floor or roadway and an underside of a load-bearing surface of the special pallet. With the industrial truck of the invention, which is provided with a low wheelarm height of the wheelarms in the lowered position and the entry guide, special pallets with a low entry height can be handled safely and without damage.

BRIEF DESCRIPTION OF THE DRAWINGS

Additional advantages and details of the invention are explained in greater detail below with reference to the exemplary embodiment which is illustrated in the accompanying schematic figures, in which like reference numbers identify like parts throughout.

DESCRIPTION OF THE PREFERRED EMBODIMENTS

Figure 1:
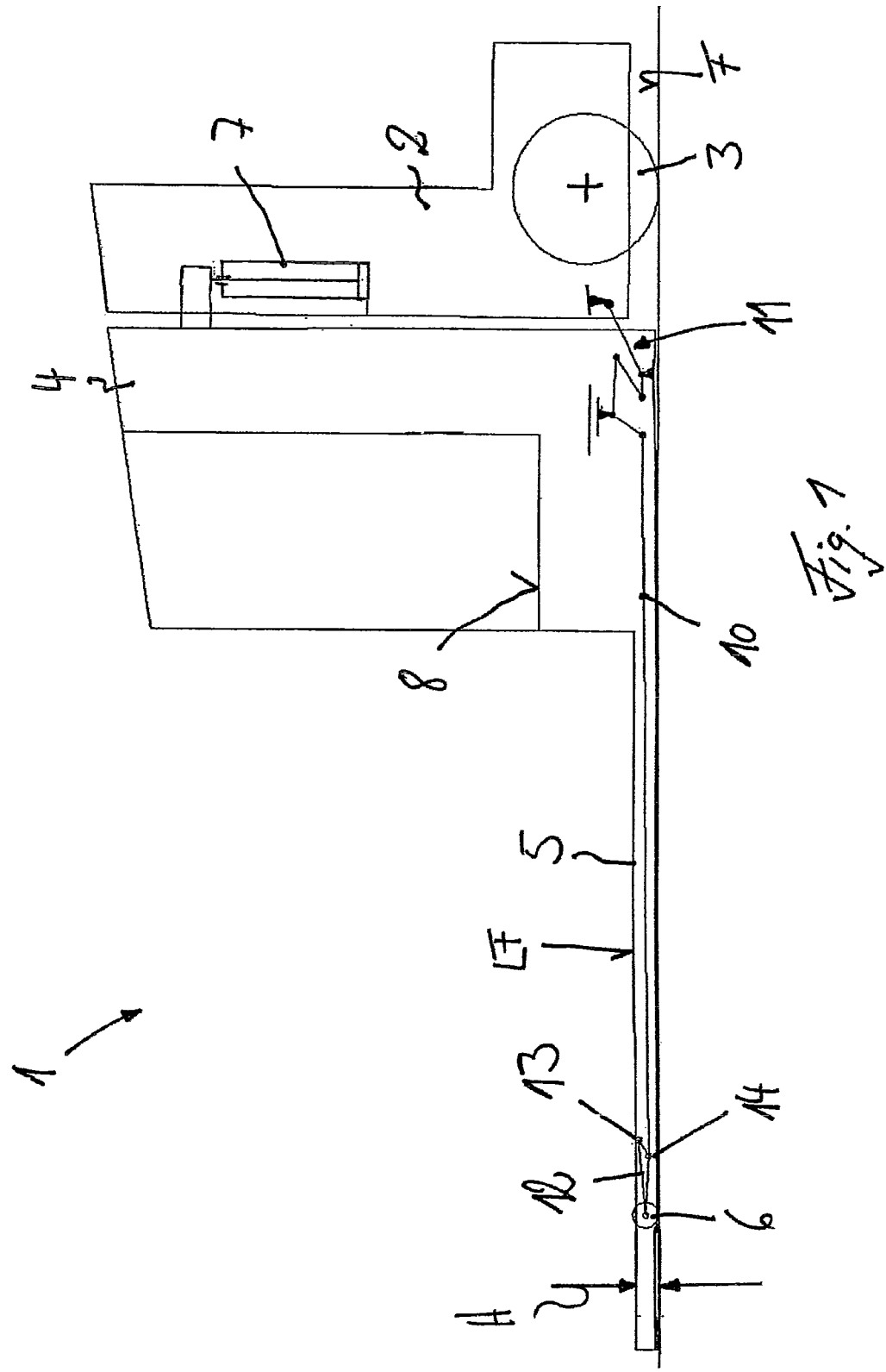
FIG. 1 shows an industrial truck of the invention in a schematic illustration with the load section in the lowered position.
Figure 2:
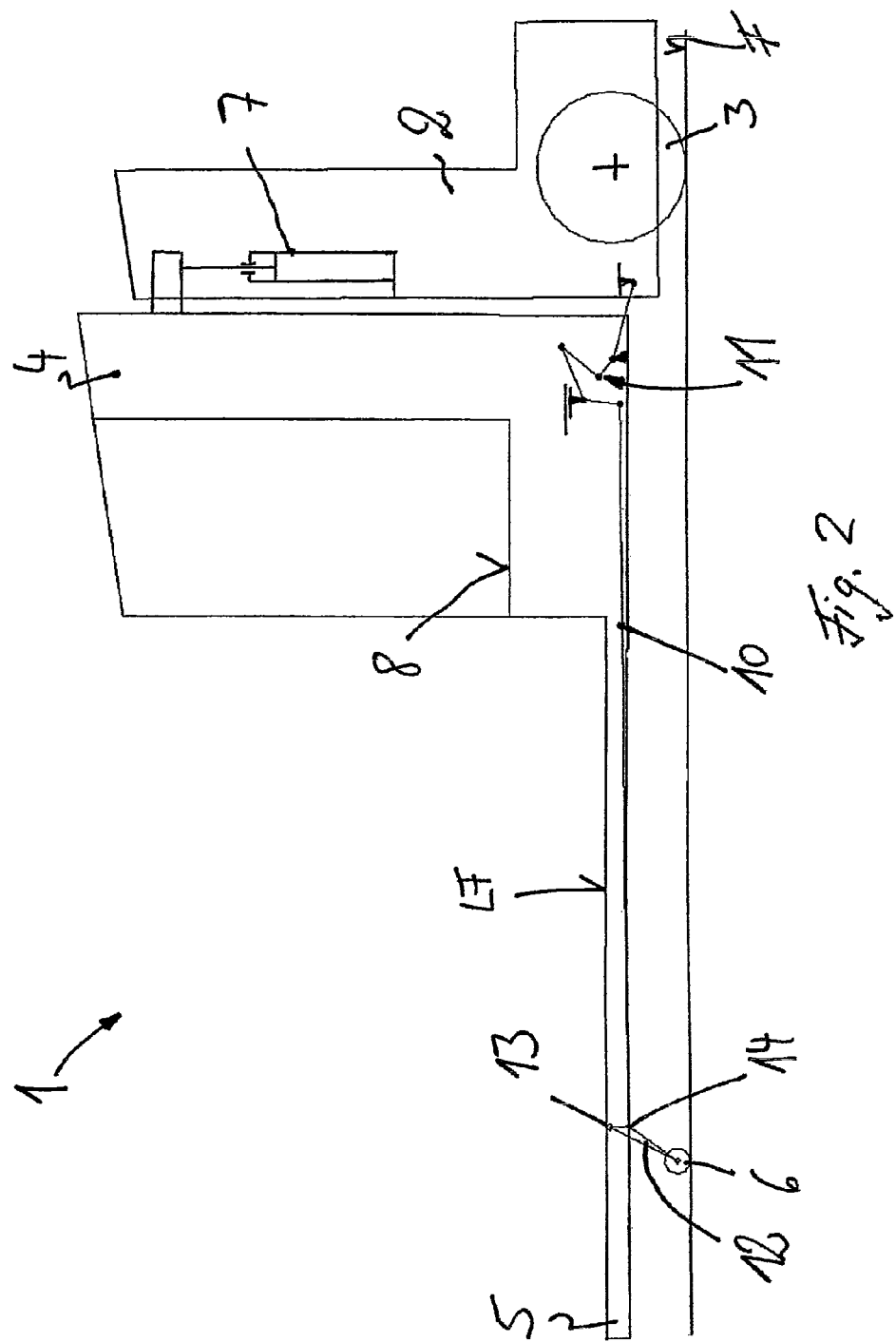
FIG. 2 shows the industrial truck illustrated in FIG. 1 with the load section fully raised.
Figure 3:
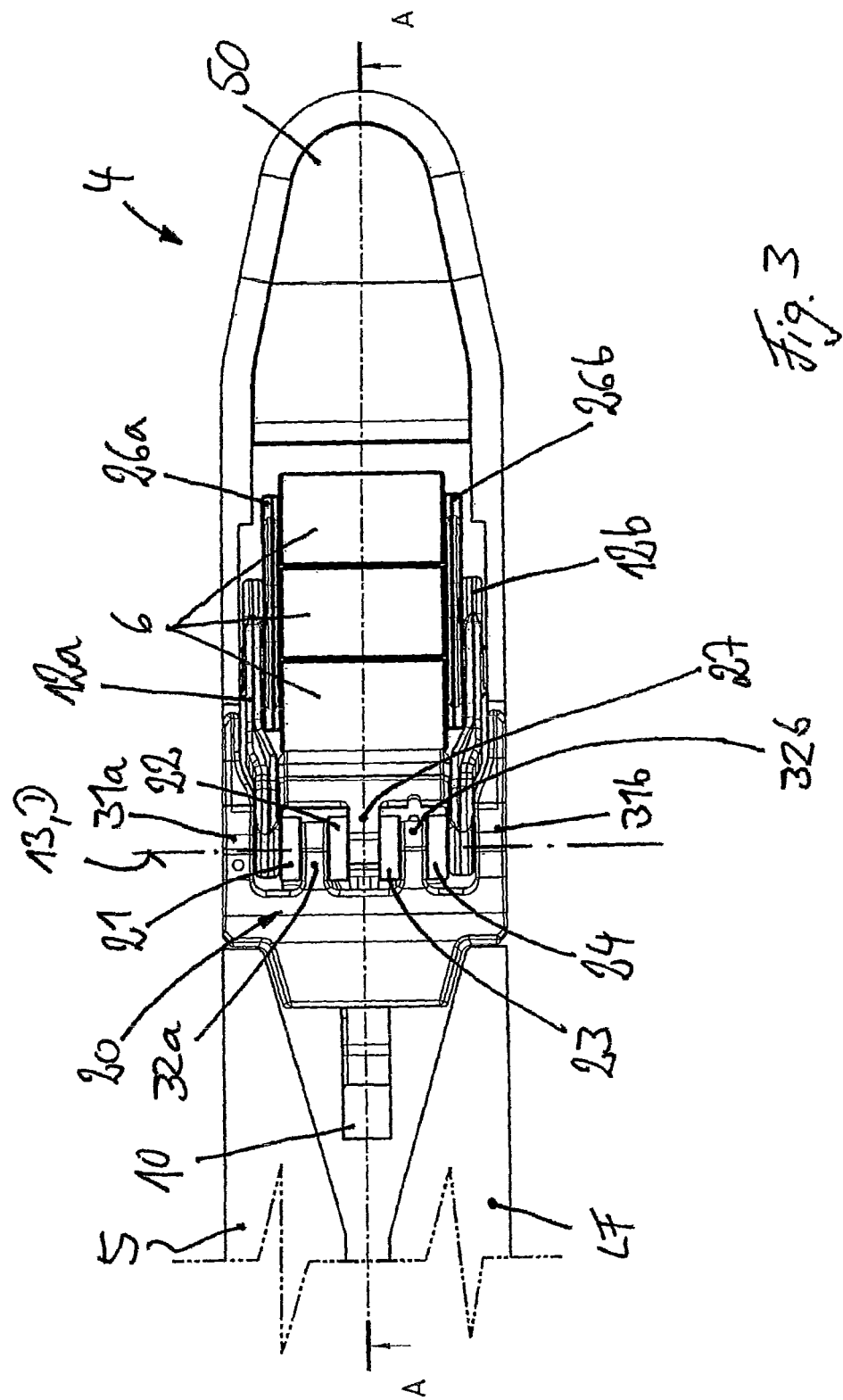
FIG. 3 is a view of the tip of a wheelarm of an industrial truck of the invention illustrated in FIGS. 1 and 2 from above.
Figure 4:
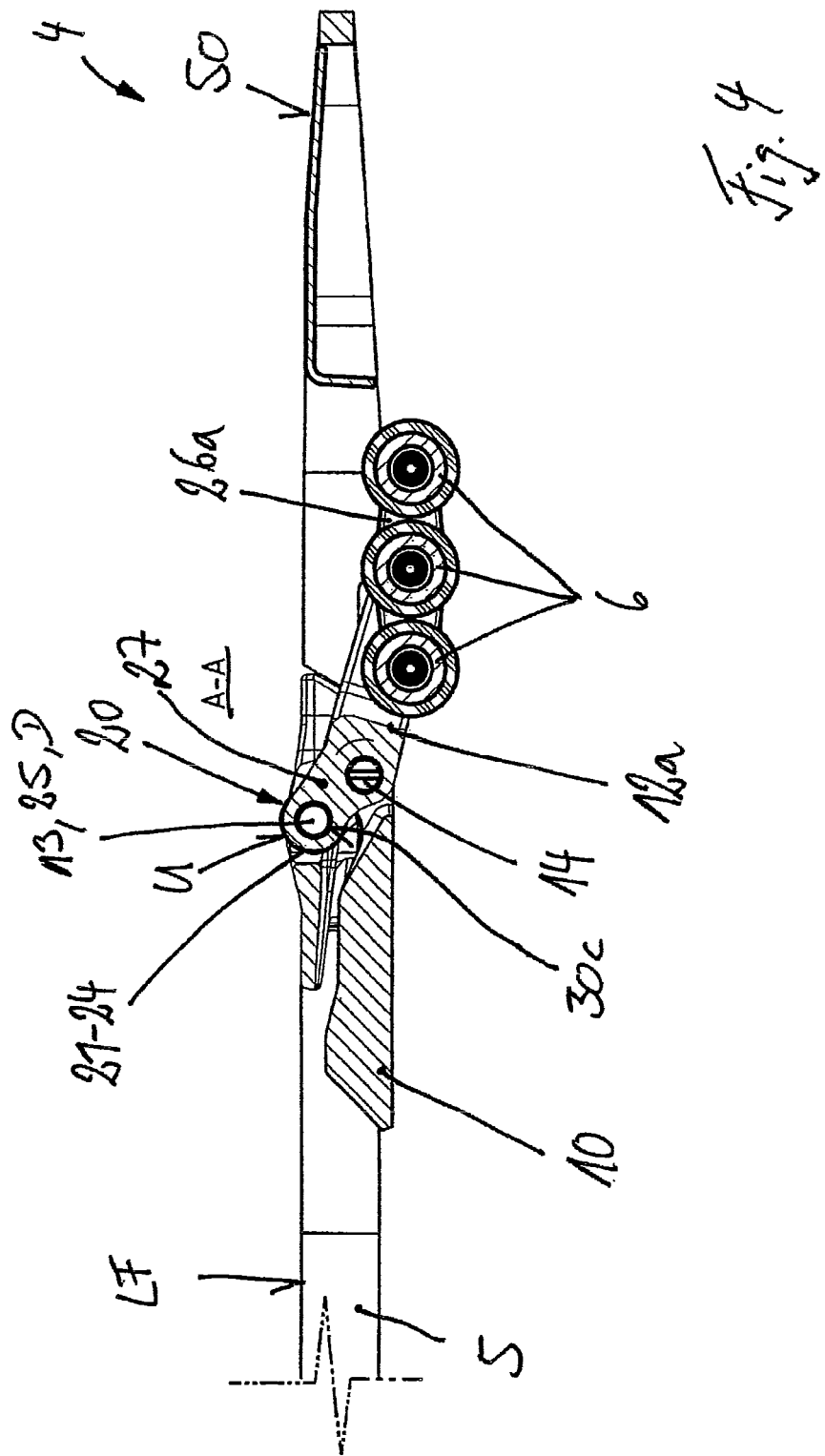
FIG. 4 is a section along line A-A in FIG. 3.
Figure 5:
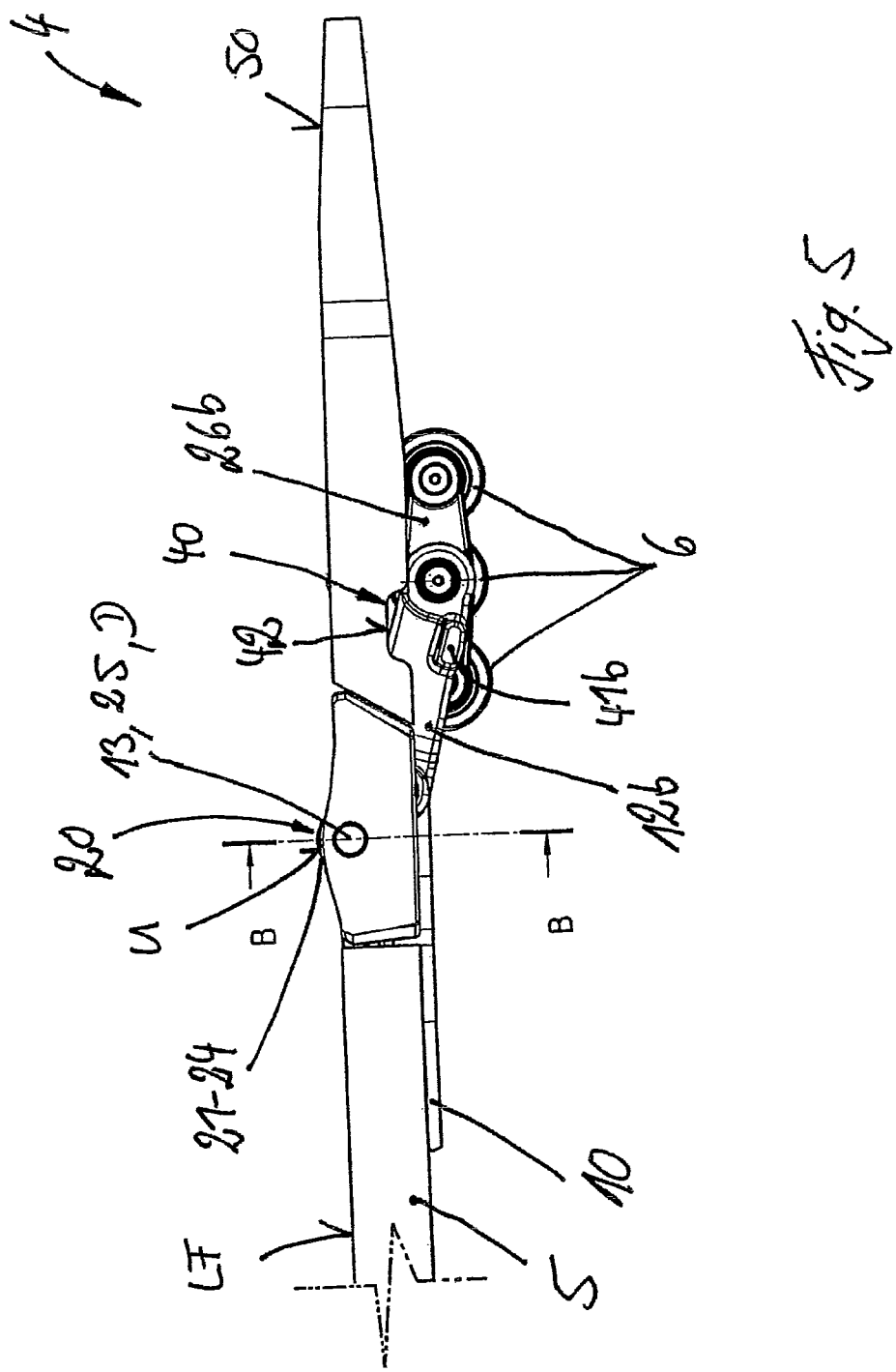
FIG. 5 is a side view of the tip of a wheelarm of the invention.
Figure 6:
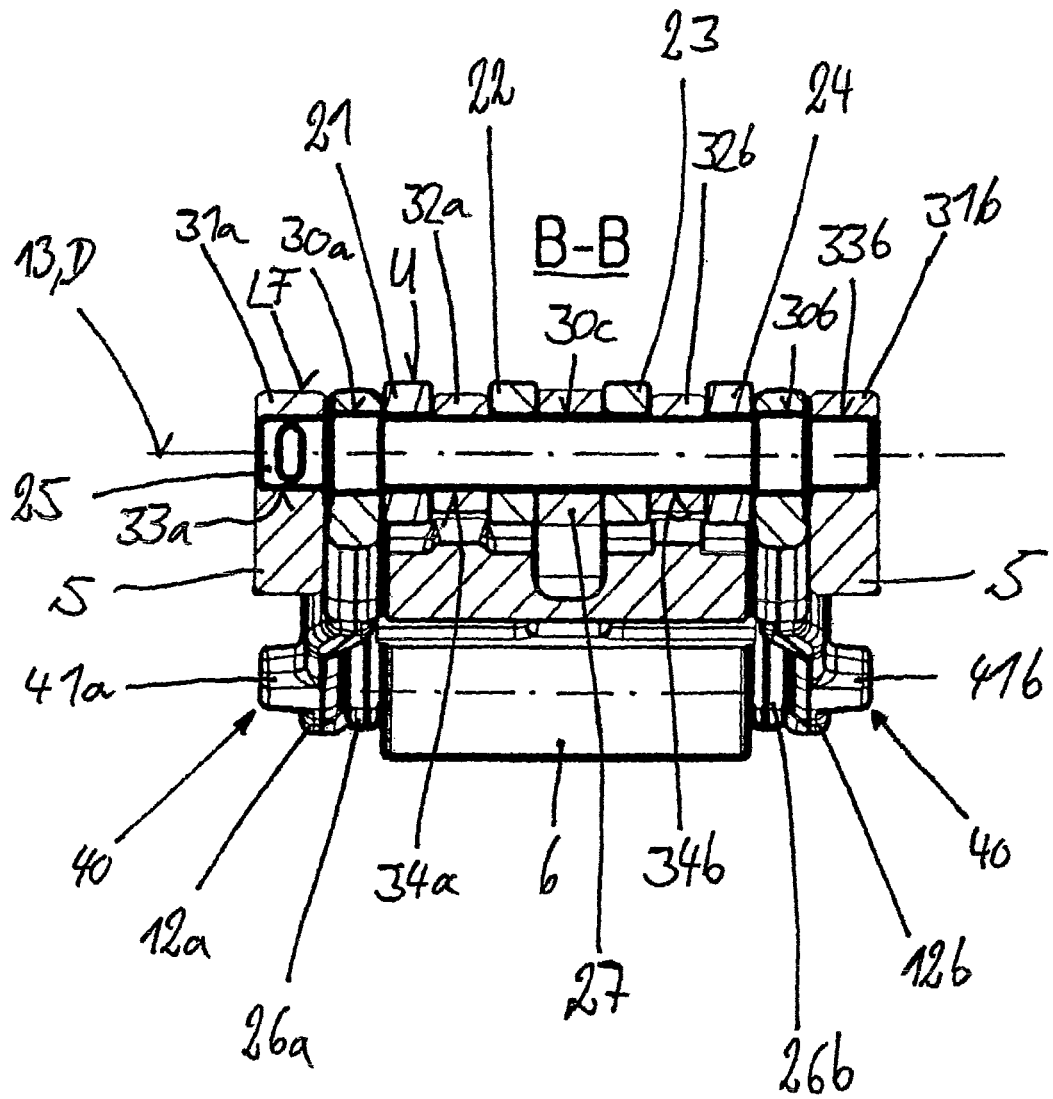
FIG. 6 is a section along line B-B in FIG. 5.

The industrial truck 1 illustrated in a side view in FIGS. 1 and 2, such as a lift truck in the form of a low-lift truck or a high-lift truck, for example, has a drive section 2 provided with a steerable drive wheel 3, and a load section 4 which can be raised and lowered relative to the drive section 2. The load section 4 preferably comprises two wheelarms 5 which are at a spaced lateral distance from each other and are supported on a roadway F by load rollers 6 which are located at or near the tip of the respective wheelarm 5. The drive section 2 is supported on the roadway F by the drive wheel 3. To increase stability, the drive section 2 can be supported on the roadway F by support rollers, which are not illustrated in any further detail. The upper sides of the wheelarms 5 form a load-bearing surface LF, which can be driven under and lift a pallet, which is not illustrated in any further detail.

To raise the load section 4, a lifting device 7 is provided, which can include one or more hydraulic cylinders, for example, and is located between the drive section 2 and the load section 4. To transmit the lifting motion of the load section 4 to the load rollers 6 on the ends of the wheelarms 5, for each wheelarm 5 there is a linkage 10 which is in an operative connection with the load rollers 6 and a lever system 11 which actuates the linkage 10. The lever system 11 can also act as a guide to guide the load section 4 during the lifting and lowering movements.

On an industrial truck 1 operated by an electric battery, the load section 4 can also include a battery compartment 8 for a traction battery which supplies electric power to an electrical traction drive of the drive wheel 3 and to an electrical drive system of the lifting device 7.

The load rollers 6 are located so that they can rotate in load roller carriers 12, which are located so that they can swivel on the corresponding wheelarm 5. For the swively-mounting of the load roller carriers 12 on the respective wheelarm 5 there is a swivel bearing 13 on each wheelarm 5. In the illustrated exemplary embodiment, the linkages 10 are in the form of connecting rods. The swivel bearing 13 is located in the vertically upper portion of the wheelarms 5. The linkages 10, which are in the form of connecting rods, are connected in the vertical direction below the swivel bearing 13 by means of coupling points 14 in an articulated manner with the load roller carrier 12.

When the load section 4 is raised by the lifting device 7, the load roller carriers 12, which are actuated by the lever system 11 and the linkage 10 and are provided with the load rollers 6, are swiveled outwardly in the counterclockwise direction downwardly around the swivel bearing 13 so that the wheelarms 5 are lifted upwardly (as shown in a fully raised position in FIG. 2). Accordingly, when the load section 4 is lowered, the load roller carriers 12 are pivoted in the clockwise direction around the swivel bearing 13, so that the wheelarms 5 are lowered.

The wheelarms 5 of the industrial truck 1 of the invention, in the fully lowered position of the load section 4, have a wheelarm height H of less than 50 mm, so that the industrial truck 1 of the invention can be used to handle special pallets which have an entry height of 50 mm for the wheelarms 5.

FIGS. 3 to 6 illustrate a constructive embodiment of the wheelarms 5 of the industrial truck 1 illustrated in FIGS. 1 and 2.

The industrial truck 1 of the invention is provided in the vicinity of the swivel bearing 13 of the load roller carrier 12 on the upper side of the respective wheelarm 5 with an entry guide 20 to facilitate the process of driving the wheelarms 5 under the pallet. The entry guide is formed by at least one roller, such as at least four rollers 21, 22, 23, 24 that are mounted so that they can rotate on the wheelarm 5. The rollers 21, 22, 23, 24 are mounted so that they can rotate around an axis of rotation D on the wheelarm 5. The rollers 21, 22, 23, 24 have a diameter such that the peripheral surface U of the rollers 21, 22, 23, 24 projects slightly beyond (above) the load-bearing surface LF on the upper side of the corresponding wheelarm 5. In one aspect, the rollers 21, 22, 23, 24 have a diameter such that the peripheral surface U of the rollers 21, 22, 23, 24 projects upwardly beyond a load-bearing surface LF on an uppermost side of the corresponding wheelarm 5.

In the illustrated exemplary embodiment, the swivel bearing 13 of the load roller carrier 12 has a bearing pin 25 on the wheelarm 5 and the rollers 21, 22, 23, 24 of the entry guide 20 are mounted on the bearing pin 25 so that the rollers can rotate. The longitudinal axis of the bearing pin 25 thus forms the axis of rotation of the rollers 21, 22, 23, 24.

To achieve the low wheel height H of less than 50 mm in the lowered position, the bearing pin 25 is supported on the wheelarm 5 at a plurality of bearing points, such as in the illustrated exemplary embodiment at four bearing points, so that the bearing pin 25 can have a small diameter.

For this purpose, the fork-shaped load roller carrier 12 has two lateral, outside bearing levers 12a, 12b, between which rockers 26a, 26b are swively-mounted. In the illustrated exemplary embodiment, three load rollers 6 are mounted in the load roller carrier 12 so that they can rotate. In addition, the load roller carrier 12 is provided with an additional central web 27 in the vicinity of the swivel bearing 13.

For support of the bearing pin 25, an outer bushing or bearing eye 30a, 30b is provided in each of the outer bearing levers 12a, 12b of the load roller carrier 12, and a center bushing or bearing eye 30c is provided in the center web 27.

For mounting of the bearing pin 25, the wheelarm 5 is provided on each of its outer sides with a bearing fork, each of which forms an outer bearing flange 31a, 31b and an inner bearing flange 32a, 32b for the bearing pins 25. To hold the bearing pin 25, there are outer bearing eyes 33a, 33b in each of the outer bearing flanges 31a, 31b, respectively, of the wheelarm 5, and there are inner bearing eyes 34a, 34b in each of the inner bearing flanges 32a, 32b, respectively, of the wheelarm 5.

The bearing pin 25 is mounted so that it is supported in alternation in a bearing eye of the wheelarm 5 and the bearing eye of the load roller carrier 12. For this purpose, the outer bearing eyes 30a, 30b formed in the respective bearing levers 12a, 12b of the load roller carrier 12 are each located in the longitudinal direction of the bearing pin 25 between the outer bearing eyes 33a, 33b and the inner bearing eyes 34a, 34b of the wheelarm 5. The center bearing eye 30c formed on the center web 27 of the load roller carrier 12 is located between the two inner bearing eyes 34a, 34b of the wheelarm 5. The two inner bearing eyes 34a, 34b on the inner bearing flanges 32a, 32b of the wheelarm 5 are located, respectively, between the outer bearing eyes 30a, 30b of the outer bearing fork 12a, 12b of the load roller carrier 12 and the center bearing eye 30c of the center web 27 of the load roller carrier 12.

The rollers 21, 22, 23, 24 of the entry guide 20 are located in the longitudinal direction of the bearing pin 25 between the outer bearing levers 12a, 12b of the load roller carrier 12. The rollers 21, 22, 23, 24, viewed in the longitudinal direction of the bearing pin 25, are each located between a bearing eye of the wheelarm 5 and a bearing eye of the load roller carrier 12. In the illustrated exemplary embodiment, one roller is located between the inner bearing flange 32a, 32b of the wheelarm 5 provided with the inner bearing eye 34a, 34b, respectively, and the center web 27 of the load roller carrier 12 provided with the center bearing eye 30c, and between the inner bearing flange 32a, 32b of the wheelarm 5 provided with the inner bearing eye 34a, 34b and the outer bearing forks 12a, 12b of the load roller carrier 12 provided with the outer bearing eyes 30a, 30b, respectively, so that two rollers each are arranged in pairs on both sides of the inner bearing eye 34a, 34b and thus of the inner bearing flange 32a, 32b of the wheelarm 5. The roller 21 is located between the outer bearing lever 12a of the load roller carrier 12 and the inner bearing flange 32a of the wheelarm 5. The roller 22 is located between the inner bearing flange 32a of the wheelarm 5 and the center web 27 of the load roller carrier 12. The roller 23 is located between the center web 27 of the load roller carrier 12 and the inner bearing flange 32b of the wheelarm 5. The roller 24 is located between the inner bearing flange 32b of the wheelarm 5 and the outer bearing lever 12b of the load roller carrier 12.

Stop means 40 are located between the load roller carrier 12 and the wheelarm 5 for the lowered position of the wheelarm 5. The stop means 40 are formed by wing-like expansions 41a, 41b on the outer sides of the bearing levers 12a, 12b of the load roller carrier 12. The expansions 41a, 41b interact with stop surfaces 42 on side plates of the wheelarm 5. The stop means 40 limit the swiveling movement of the load roller carriers 12 upwardly in the fully lowered position of the wheelarms 5 and, in connection with a corresponding design of the linkage 10 which actuates the corresponding load roller carrier 12, make it possible to leave an open space in the fully lowered position between the rollers 21, 22, 23, 24 and the linkage 10, which makes possible the rotation of the rollers 21, 22, 23, 24 on the bearing pin 25.

The wheelarms 5 are also provided on the tip with a beveled portion 50 that points vertically downwardly, which facilitates the entry into the pickup openings of the pallet.

When the fully lowered wheelarms 5 are inserted into the pickup openings of a pallet sitting on the roadway F, a low level of friction between the wheelarms 5 and the pallet can be achieved with the rollers 21, 22, 23, 24. The rotatable rollers 21, 22, 23, 24 can be placed in contact with the underside of the load-bearing surface of the pallet and reduce the friction that occurs, which means that less force is required to insert the wheelarms 5 into the pickup openings of the pallet. At a reduced entry height, for example with a damaged pallet or a pallet which is sagging under a load, or with special pallets which have a low entry height in which there are very small tolerances between the height H of the wheelarm and the entry height, the entry guide 20, which is formed by the rotatable rollers 21, 22, 23, 24 located on the upper side of the wheelarm 5, can prevent damage to the pallet as the wheelarms 5 are inserted into the pallets.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An industrial truck, comprising:
   a drive section;
   a load section moveable relative to the drive section;
   at least one wheelarm connected to the load section, wherein the wheelarm includes at least one load roller, wherein the load roller is rotatably mounted in a load roller carrier swivelably-mounted by a swivel bearing on the wheelarm; and
   an entry guide on an upper side of the wheelarm in a vicinity of the swivel bearing of the load roller carrier, wherein the entry guide comprises at least one roller rotatably mounted on the swivel bearing and projecting upwardly beyond a load-bearing surface on an uppermost side of the wheelarm.

2. The industrial truck of claim 1, wherein the swivel bearing of the load roller carrier comprises a bearing pin located in the wheelarm, and wherein the at least one roller is rotatably mounted on the bearing pin.

3. The industrial truck of claim 2, wherein the load roller carrier includes two lateral bearing levers, in each of which there is an outer bearing eye for the bearing pin, and wherein the at least one roller is located between the bearing levers.

4. The industrial truck of claim 2, wherein the bearing pin is supported in at least one bearing eye of the wheelarm and at least one bearing eye of the load roller carrier, and wherein the at least one roller is located in a longitudinal direction of the bearing pin between the bearing eye of the wheelarm and the bearing eye of the load roller carrier.

5. The industrial truck of claim 2, wherein the load roller carrier includes two outer bearing eyes and a center bearing eye for the bearing pin, wherein a bearing eye of the wheelarm is located between the center bearing eye and an adjacent outer bearing eye of the load roller carrier, and wherein rollers are located between a respective bearing eye of the wheelarm and the center bearing eye of the load roller carrier and between the bearing eye of the wheelarm and the outer bearing eye of the load roller carrier.

6. The industrial truck of claim 1, further including stop means for a lowered position of the wheelarm located between the load roller carrier and the wheelarm.

7. The industrial truck of claim 1, wherein the wheelarm, in a fully lowered position of the load section, has a wheelarm height of less than 50 mm.

8. A system comprising:
   an industrial truck of claim 1 with a maximum wheelarm height of the wheelarm in a fully lowered position of the load section of 50 mm; and
   a pallet having an entry height of a pickup opening for the wheelarms of the industrial truck of 50 mm between a road surface and an underside of a load-bearing surface of the pallet.

* * * * *